United States Patent
Obiagwu

(10) Patent No.: US 12,425,192 B2
(45) Date of Patent: Sep. 23, 2025

(54) SERVICE-ORIENTED ARCHITECTURE IN A VEHICLE

(71) Applicant: Ford Global Technologies, LLC, Dearborn, MI (US)

(72) Inventor: Francis Obiagwu, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 719 days.

(21) Appl. No.: 17/158,452

(22) Filed: Jan. 26, 2021

(65) Prior Publication Data

US 2022/0239472 A1 Jul. 28, 2022

(51) Int. Cl.
| | |
|---|---|
| *H04L 29/06* | (2006.01) |
| *H04L 9/06* | (2006.01) |
| *H04L 9/08* | (2006.01) |
| *H04L 9/14* | (2006.01) |
| *H04L 9/32* | (2006.01) |
| *H04L 67/12* | (2022.01) |

(52) U.S. Cl.
CPC .............. *H04L 9/0825* (2013.01); *H04L 9/06* (2013.01); *H04L 9/14* (2013.01); *H04L 9/3247* (2013.01); *H04L 67/12* (2013.01); *H04L 2209/84* (2013.01)

(58) Field of Classification Search
CPC . H04L 9/0825; H04L 9/06; H04L 9/14; H04L 9/3247; H04L 67/12; H04L 2209/84; H04L 9/0897; H04L 63/00
See application file for complete search history.

(56) References Cited

U.S. PATENT DOCUMENTS

| | | | |
|---|---|---|---|
| 10,140,783 B2 | 11/2018 | Thornburg et al. | |
| 10,776,169 B2 | 9/2020 | Teshler et al. | |
| 2012/0011360 A1* | 1/2012 | Engels | H04L 9/083 380/278 |
| 2019/0349733 A1* | 11/2019 | Nolan | H04L 41/0806 |
| 2019/0387430 A1* | 12/2019 | Ingerman | H04W 28/0231 |

FOREIGN PATENT DOCUMENTS

| | | |
|---|---|---|
| CN | 104852902 A | 8/2015 |
| WO | 2020070061 A | 4/2020 |

* cited by examiner

*Primary Examiner* — Joseph P Hirl
*Assistant Examiner* — Leynna Truvan
(74) *Attorney, Agent, or Firm* — Christopher Storms; Brooks Kushman P.C.

(57) ABSTRACT

A vehicle system includes a manager module, a node, and a wired vehicle communications network connecting the node and the manager module. The manager module is programmed to receive a request to publish or subscribe to a message topic from the node; authenticate the node using the request; authorize the node by verifying that the node is on a permission list for the message topic; and upon authenticating and authorizing the node, transmit a symmetric key to the node. The node is programmed to encrypt or decrypt messages about the message topic using the symmetric key.

18 Claims, 3 Drawing Sheets

SERVICE-ORIENTED ARCHITECTURE IN A VEHICLE

BACKGROUND

A service-oriented architecture is a software environment in which applications on a network act as publishers or subscribers for message topics. A message topic is a category of data or update for which messages can be sent between applications. An application can be a publisher or a subscriber with respect to a specific message topic. A publisher for a given message topic sends messages about the message topic to subscribers to that message topic.

DETAILED DESCRIPTION

Figure 1:
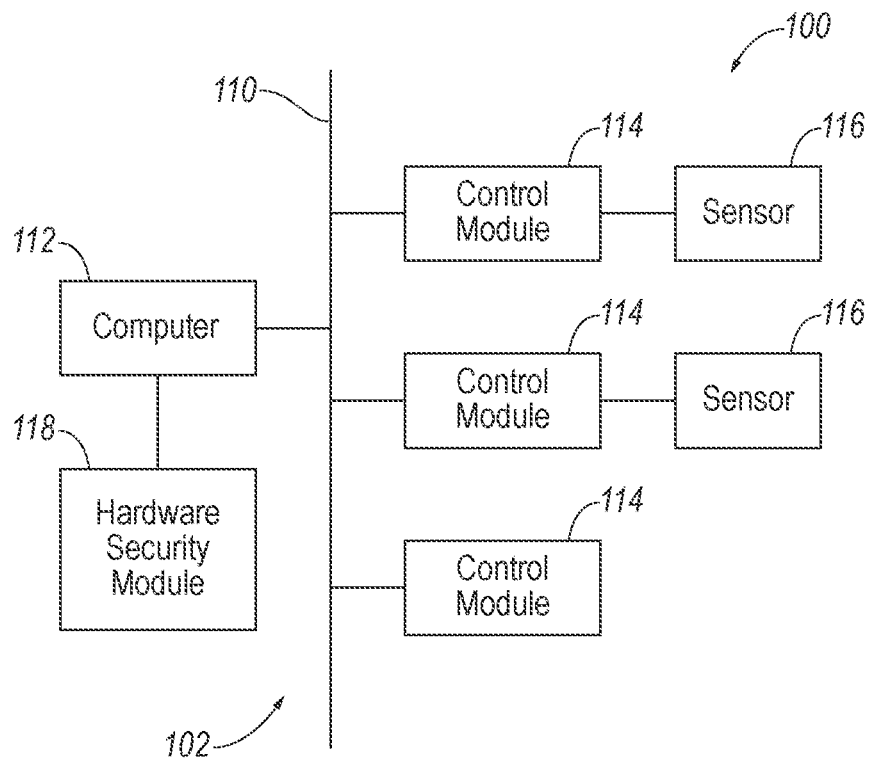
FIG. 1 is a block diagram of an example vehicle.

The vehicle system described herein provides a secure and computationally efficient manner of communication within a service-oriented architecture on board a vehicle. Encrypting communications between publisher nodes and subscriber nodes to a message topic makes those communications more secure, but encrypting and decrypting the messages adds to the computational cost of the communications. As described herein, a manager module authenticates publisher nodes and subscriber nodes and then authorizes them according to a permission list for a specific message topic. A symmetric key is provided to the authenticated and authorized publisher nodes and subscriber nodes. The vehicle system thus permits subscriber nodes and publisher nodes to switch from public-key encryption to symmetric-key encryption, which is computationally more efficient. The manager module can help ensure security by limiting the distribution of symmetric keys to only the publisher nodes and subscriber nodes of the message topic. Different symmetric keys can be used for different message topics, limiting the distribution of each symmetric key. This manner of distribution permits regular expiration of the symmetric keys, e.g., every ignition cycle of the vehicle, thus providing an additional layer of security.

A computer includes a processor and a memory storing instructions executable by the processor to receive a request to publish or subscribe to a message topic from a node on a wired vehicle communications network via the wired vehicle communications network; authenticate the node using the request; authorize the node by verifying that the node is on a permission list for the message topic; and upon authenticating and authorizing the node, transmit a symmetric key to the node. The symmetric key is usable to encrypt or decrypt messages about the message topic.

The instructions may include instructions to receive a sample message from the node encrypted with the symmetric key, decrypt the sample message, and retransmit the symmetric key to the node upon determining that the decrypted sample message does not match a stored sample message.

Authenticating the node may include applying public key cryptography to the request. The public key cryptography may be a digital signature for which the request is encrypted with a node private key, and authenticating the node may include decrypting the request with a node public key paired with the node private key. The instructions may include instructions to encrypt the symmetric key with the node public key before transmitting the symmetric key to the node.

The instructions may include instructions to generate the symmetric key upon starting of a vehicle including the node.

The instructions may include instructions to generate a plurality of symmetric keys including the symmetric key for a plurality of respective message topics including the message topic.

The request may be a request to publish the message topic, and the symmetric key may be usable to encrypt message about the message topic. The node may be a publisher node, the symmetric key may be a first symmetric key, and the instructions may include instructions to receive a request to subscribe to the message topic from a subscriber node on the wired vehicle communications network via the wired vehicle communications network; authenticate the subscriber node using the request to subscribe; authorize the subscriber node by verifying that the subscriber node is on the permission list for the message topic; and upon authenticating and authorizing the subscriber node, transmit a second symmetric key paired with the first symmetric key to the subscriber node, wherein the second symmetric key is usable to decrypt messages about the message topic.

A vehicle system includes a manager module, a node, and a wired vehicle communications network connecting the node and the manager module. The manager module is programmed to receive a request to publish or subscribe to a message topic from the node; authenticate the node using the request; authorize the node by verifying that the node is on a permission list for the message topic; and upon authenticating and authorizing the node, transmit a symmetric key to the node. The node is programmed to encrypt or decrypt messages about the message topic using the symmetric key.

The vehicle system may further include a hardware security module physically connected to the manager module, and the permission list may be stored on the hardware security module.

The node may be storing a node private key, and the node may be programmed to encrypt the request with the node private key and then transmit the request to the manager module. The vehicle system may further include a hardware security module physically connected to the manager module, and authenticating the node may include decrypting the request with a node public key paired with the node private key, and the node public key may be stored on the hardware security module.

The node may be a publisher node, the request may be a request to publish the message topic, and the symmetric key may be usable to encrypt message about the message topic. The vehicle system may further include a subscriber node connected to the manager module and the publisher node via the wired vehicle communications network. The symmetric key may be a first symmetric key, the manager module may be further programmed to receive a request to subscribe to the message topic from the subscriber node; authenticate the subscriber node using the request to subscribe; authorize the subscriber node by verifying that the subscriber node is on the permission list for the message topic; and upon authenticating and authorizing the subscriber node, transmit a second symmetric key paired with the first symmetric key to the subscriber node, and the subscriber node may be programmed to decrypt messages about the message topic using the second symmetric key.

A method includes transmitting a request to publish or subscribe to a message topic by a node in a vehicle to a manager module in the vehicle; authenticating the node using the request by the manager module; authorizing the node by verifying that the node is on a permission list for the message topic by the manager module; upon authenticating and authorizing the node, transmitting a symmetric key to the node by the manager module; and encrypting or decrypting messages about the message topic using the symmetric key by the node.

The method may further include, upon receiving the symmetric key, encrypting a sample message with the symmetric key by the node, and transmitting the encrypted sample message by the node to the manager module. The method may further include decrypting the encrypted sample message by the manager module, and retransmitting the symmetric key by the manager module to the node upon determining that the decrypted sample message does not match a stored sample message on the manager module.

The method may further include generating the symmetric key by the manager module upon the vehicle starting.

With reference to the Figures, a vehicle system 102 of a vehicle 100 includes a manager module 104, a node 106, 108, and a wired vehicle communications network 110 connecting the node 106, 108 and the manager module 104. The manager module 104 is programmed to receive a request to publish or subscribe to a message topic from the node 106, 108; authenticate the node 106, 108 using the request; authorize the node 106, 108 by verifying that the node 106, 108 is on a permission list for the message topic; and upon authenticating and authorizing the node 106, 108, transmit a symmetric key to the node 106, 108. The node 106, 108 is programmed to encrypt or decrypt messages about the message topic using the symmetric key.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The vehicle system 102 includes a computer 112. The computer 112 is a microprocessor-based computing device, e.g., a generic computing device including a processor and a memory, an electronic controller or the like, a field-programmable gate array (FPGA), an application-specific integrated circuit (ASIC), etc. The computer 112 can thus include a processor, a memory, etc. The memory of the computer 112 can include media for storing instructions executable by the processor as well as for electronically storing data and/or databases, and/or the computer 112 can include structures such as the foregoing by which programming is provided. The computer 112 can be multiple computers coupled together. The manager module 104 can be a software module installed on the computer 112.

The computer 112 may transmit and receive data through the wired vehicle communications network 110 such as a controller area network (CAN) bus, Ethernet, Local Interconnect Network (LIN), onboard diagnostics connector (OBD-II), any other type of wired network, or a combination of different types of wired networks. The computer 112 may be communicatively coupled to a plurality of control modules 114 and other components via the wired vehicle communications network 110.

The control modules 114 are microprocessor-based computing devices, e.g., generic computing devices each including a processor and a memory, electronic controllers or the like, field-programmable gate arrays (FPGA), application-specific integrated circuits (ASIC), etc. Each control module 114 can thus include a processor, a memory, etc. The memory of each control module 114 can include media for storing instructions executable by the processor as well as for electronically storing data and/or databases, and/or each control module 114 can include structures such as the foregoing by which programming is provided. The control modules 114 can operate different systems in the vehicle 100, e.g., a body control module, a powertrain control module, a restraint control module, etc. The control modules 114 can receive data from sensors 116 connected to the control modules 114.

The vehicle 100 includes the sensors 116 coupled to respective control modules 114. The sensors 116 may provide data about operation of the vehicle 100, for example, wheel speed, wheel orientation, and engine and transmission data (e.g., temperature, fuel consumption, etc.). The sensors 116 may detect the location and/or orientation of the vehicle 100. For example, the sensors 116 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 116 may detect the external world, e.g., objects and/or characteristics of surroundings of the vehicle 100, such as other vehicles, road lane markings, traffic lights and/or signs, pedestrians, etc. For example, the sensors 116 may include radar sensors, scanning laser range finders, light detection and ranging (LIDAR) devices, and image processing sensors such as cameras.

The vehicle system 102 can include a hardware security module 118 physically connected to the computer 112 and thus to the manager module 104 running on the computer 112. A hardware security module 118 is a physical computing device that safeguards and manages digital keys, performs encryption and decryption functions for digital signatures, strong authentication, and other cryptographic functions. The hardware security module 118 can be removable by a technician. As described below, the permission lists can be stored on the hardware security module 118.

Figure 2:
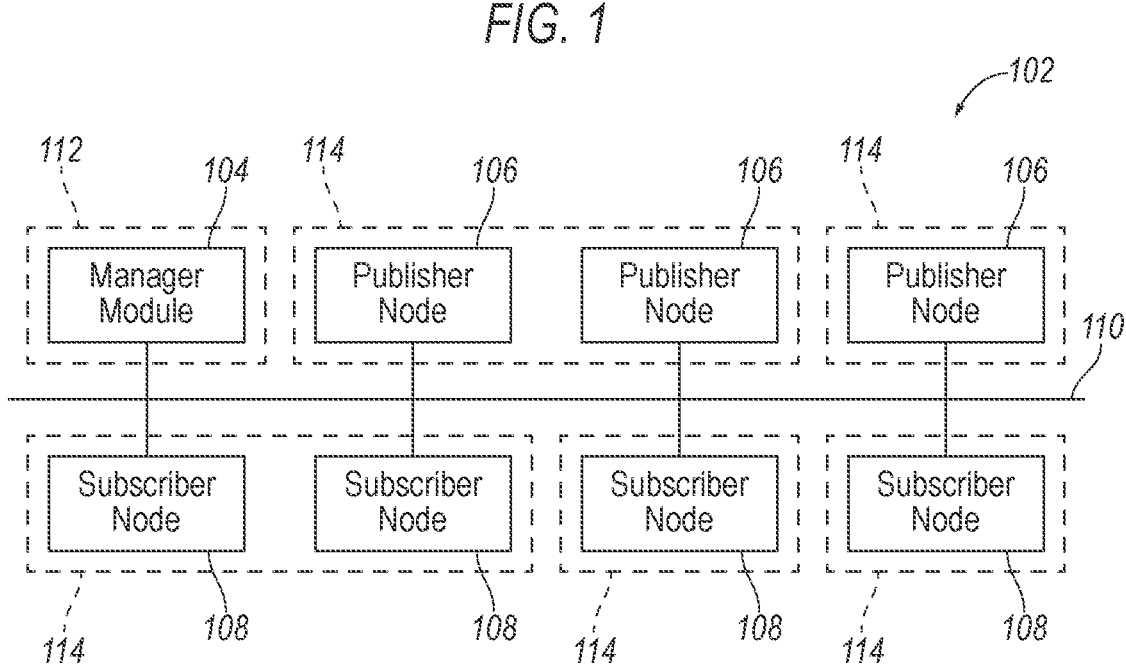
FIG. 2 is a block diagram of an example service-oriented architecture of the vehicle.

With reference to FIG. 2, a service-oriented architecture is implemented on the computer 112, the control modules 114, and the wired vehicle communications network 110. The service-oriented architecture is a software environment, i.e., implemented according to program instructions stored an executable by the computer 112 and/or the control modules 114, in which applications on devices on the wired vehicle communications network 110, e.g., computer 112 and/or control modules 114, act as the publisher nodes 106 or the subscriber nodes 108 for message topics. A message topic is a category of data or update for which messages can be sent between nodes 106, 108. Examples of message topics are different types or categories of data produced by the sensors 116, e.g., a message topic could be image data from cameras or a particular camera, engine temperature from a temperature sensor, position updates from a GPS sensor, etc.

A node 106, 108 is a software program installed on one of the control modules 114, e.g., a data-processing program for one of the sensors 116 such as a camera, a navigation application, a driver-assistance system such as active cruise control, etc. A publisher node 106 for a given message topic sends messages about the message topic to subscriber nodes 108 to that message topic; e.g., the data-processing program can be a publisher node 106 of image data, and the driver-assistance system can be a subscriber node 108 of the image data. For another example, a GPS program can be a publisher node 106 of position updates, and the navigation application can be a subscriber node 108 of the position updates. Each control module 114 can have multiple nodes 106, 108 installed. A node 106, 108 can be a publisher node 106 or a subscriber node 108 with respect to a specific message topic. The same node 106, 108 can be a publisher node 106 for one message topic and a subscriber node 108 for a different message topic. The manager module 104 is a node with higher security privileges than the publisher nodes 106 and subscriber nodes 108. The nodes 106, 108 are connected to each other via the wired vehicle communications network 110.

The publisher nodes 106 and subscriber nodes 108 for the message topics are stored in the permission list. For each message topic, the permission list contains the publisher nodes 106 and subscriber nodes 108. Any nodes 106, 108 that are not on the permission list for a message topic are not authorized to send or receive messages about the message topic. The permission list can be stored on the hardware security module 118.

Each node 106, 108 can communicate using public-key encryption involving a node public key and a node private key. Each node 106, 108 stores the node private key, i.e., the node private key is stored in the control module 114 on which the node 106, 108 is running. The node public keys can be stored on the hardware security module 118. The manager module 104 can encrypt messages to a node 106, 108 using the node public key, and the node 106, 108 can decrypt the messages using the node private key. The node 106, 108 can encrypt messages to the manager module 104 using the node private key, and the manager module 104 can decrypt the messages using the node public key.

As described below with respect to the processes 300 and 400, the publisher nodes 106 and subscriber nodes 108 to a message topic can switch from using a public-private key pair to using a symmetric key to send and receive messages about the message topic. For the purposes of this disclosure, a symmetric key is a cryptographic key usable to encrypt plaintext and decrypt ciphertext, or a pair of cryptographic keys respectively usable to encrypt plaintext and decrypt ciphertext and related by a simple transformation. The symmetric key can be a first symmetric key or a second symmetric key. A first symmetric key is usable to encrypt messages about the message topic, and a second symmetric key is usable to decrypt messages about the message topic. The first and second symmetric keys may be the same symmetric key, or a simple transformation may be used to go between the first and second symmetric keys.

Figure 3:
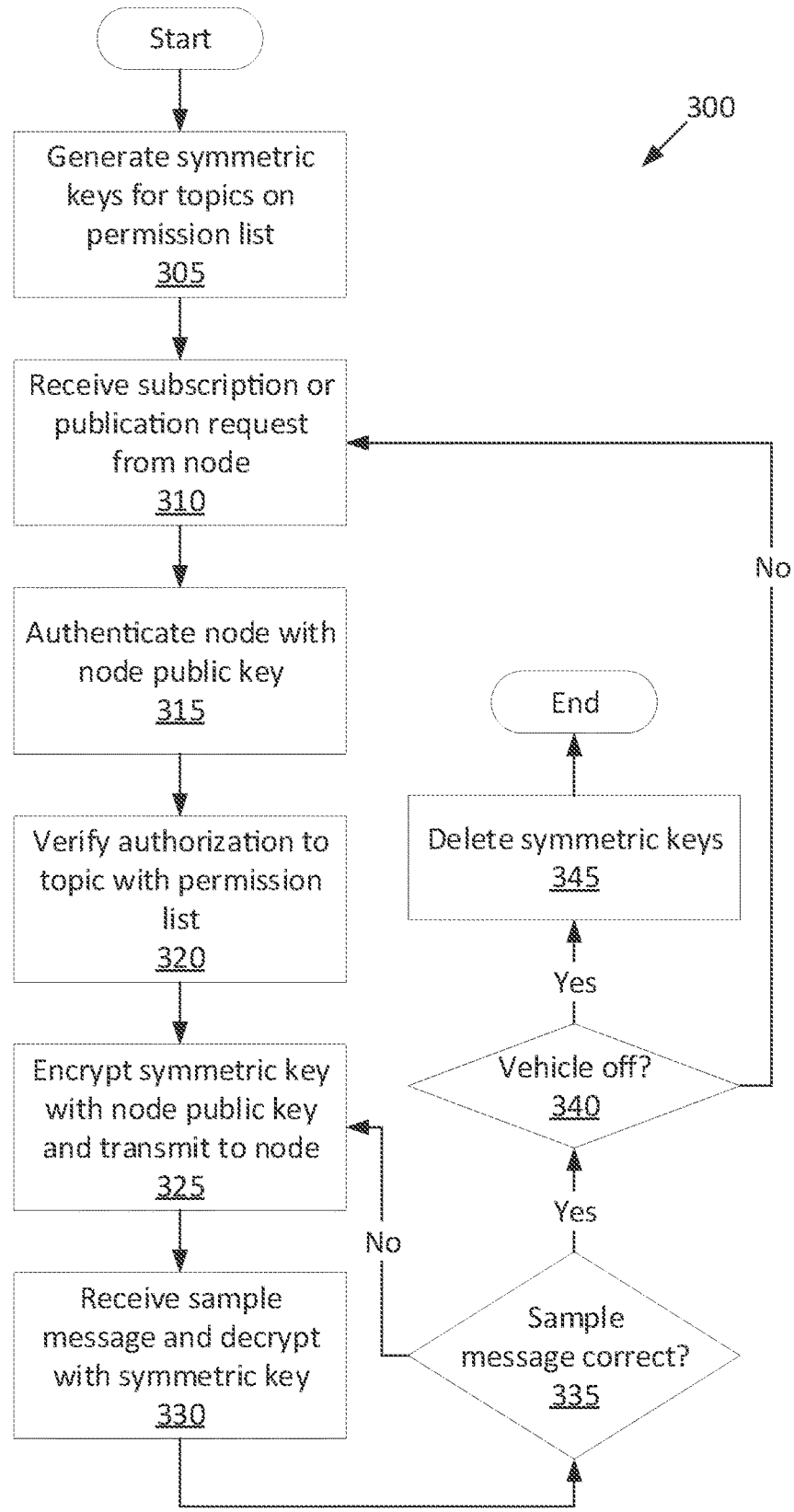
FIG. 3 is a process flow diagram of an example process for a manager module to transmit a symmetric key to a node in the service-oriented architecture.

FIG. 3 is a process flow diagram illustrating an exemplary process 300 for the manager module 104 to transmit a symmetric key to one of the nodes 106, 108 in the service-oriented architecture. The memory of the computer 112 stores executable instructions for performing the steps of the process 300 and/or programming can be implemented in structures such as mentioned above, specifically in the form of the manager module 104. The process 300 can begin when the vehicle 100 starts. As a general overview of the process 300, the manager module 104 generates symmetric keys for topics on the permission list, receives a publication or subscription request from one of the nodes 106, 108, authenticates the node 106, 108 using the node public key, verifies the authorization of the node 106, 108 for the requested message topic using the permission list, encrypts the symmetric key with the node public key and transmits it to the node 106, 108, and receives a sample message from the node 106, 108 and decrypts it using the symmetric key. If the sample message is incorrect, the manager module 104 sends the encrypted symmetric key again. The process 300 continues for as long as the vehicle 100 is on, continuing to provide symmetric keys for the publisher nodes 106 and subscriber nodes 108 for different message topics. Once the vehicle 100 turns off, the symmetric keys are deleted, so different symmetric keys will be used for the message topics during the next trip by the vehicle 100.

The process 300 begins in a block 305 upon the starting of the vehicle 100. In the block 305, the manager module 104 generates a plurality of symmetric keys for a plurality of respective message topics. The manager module 104 generates a first symmetric key usable for encrypting and a corresponding second symmetric key usable for decrypting messages about a given message topic. The first and second symmetric keys can be the same symmetric key usable for both encrypting and decrypting messages about the message topic. The manager module 104 can use any suitable method for generating the symmetric keys, e.g., a pseudorandom key generator, as is known.

Next, in a block 310, the manager module 104 receives a request to publish or subscribe to a message topic from one of the nodes 106, 108 via the wired vehicle communications network 110. The manager module 104 either receives a request to publish about the message topic from a publisher node 106 or a request to subscribe to the message topic from a subscriber node 108. The request may include a digital signature encrypted by the node 106, 108 using the node private key of that node 106, 108.

Next, in a block 315, the manager module 104 authenticates the node 106, 108 using the request, e.g., by applying public key cryptography to the request. The public key cryptography can be the digital signature encrypted with the node private key in the request. The manager module 104 can decrypt the digital signature using the node public key that is paired with the node private key. The manager module 104 then compares the decrypted digital signature with a portion of the request that should match the decrypted digital signature, and if they do match, the node 106, 108 is authenticated.

Next, in a block 320, the manager module 104 authorizes the node 106, 108 by verifying that the node 106, 108 is on the permission list for the requested message topic.

Next, in a block 325, the manager module 104 encrypts the symmetric key for the requested message topic using the node public key of the requesting node 106, 108. If the first and second symmetric keys for the requested message topic are different, the manager module 104 encrypts the first symmetric key for a request to publish by a publisher node 106 and the second symmetric key for a request to subscribe by a subscriber node 108. The manager module 104 then transmits the encrypted symmetric key to the node 106, 108 via the wired vehicle communications network 110.

Next, in a block 330, the manager module 104 receives a sample message from the node 106, 108. As described below with respect to the process 400, upon receiving and decrypting the symmetric key transmitted in the block 325, the node 106, 108 encrypts a sample message using the received symmetric key and transmits the encrypted sample message back to the manager module 104 to test that the symmetric key was received successfully. The sample message is a message that is known in advance and stored in the manager module 104 and in the node 106, 108. Upon receiving the encrypted sample message, the manager module 104 decrypts the sample message. If the first and second symmetric keys are different, the manager module 104 uses the opposite of the one of the first and second symmetric keys transmitted in the block 325 to decrypt the sample message.

Next, in a decision block 335, the manager module 104 determines whether the decrypted sample message matches, i.e., is the same as, the stored sample message stored in the manager module 104. If the sample messages do not match, that indicates that an error occurred in transmitting the symmetric key to the node 106, 108. Upon determining that the decrypted sample message does not match the stored sample message, the process 300 returns to the block 325 to retransmit the symmetric key to the node 106, 108. Upon determining that the decrypted sample message matches the stored sample message, the process 300 proceeds to a decision block 340.

In the decision block 340, the manager module 104 determines whether the vehicle 100 has been turned off. If the vehicle 100 is still on, the process 300 returns to the block 310 to receive a next publication or subscription request from a next node 106, 108. If the vehicle 100 has been turned off, the process 300 proceeds to a block 345.

In the block 345, the manager module 104 deletes the symmetric keys for the message topics. The next time that the vehicle 100 is turned on, the process 300 will begin in the block 305 by generating new symmetric keys that are virtually certain to be different from the symmetric keys currently in use. After the block 345, the process 300 ends.

Figure 4:
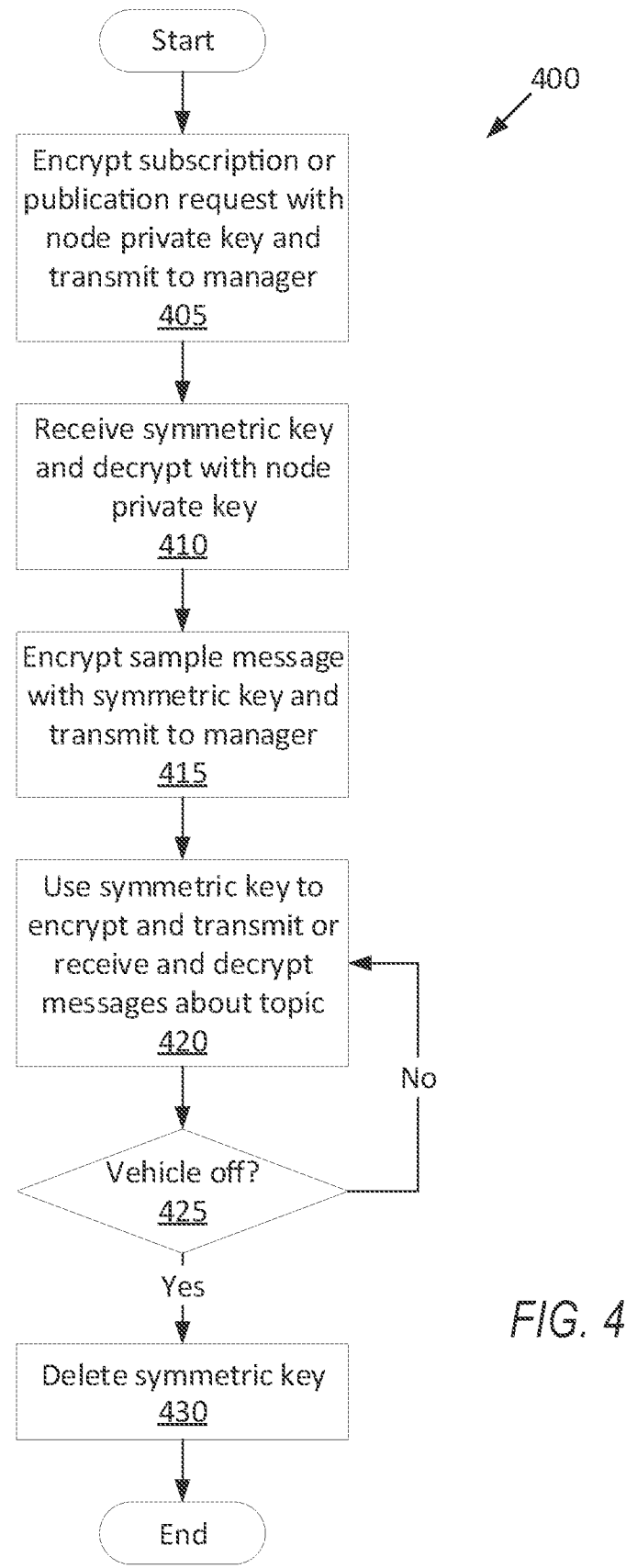
FIG. 4 is a process flow diagram of an example process for the node to receive the symmetric key.

FIG. 4 is a process flow diagram illustrating an exemplary process 400 for one of the nodes 106, 108 to receive the symmetric key. The memory of the control module 114 containing the node 106, 108 stores executable instructions for performing the steps of the process 400 and/or programming can be implemented in structures such as mentioned above, specifically in the form of the node 106, 108. The process 400 can begin when the vehicle 100 starts. As a general overview of the process 400, the node 106, 108 encrypts a request to publish and subscribe and transmits it to the manager module 104, receives and decrypts a symmetric key from the manager module 104, encrypts a sample message with the symmetric key and transmits it to the manager module 104, and begins using the symmetric key for messages about the message topic. The process 400 continues for as long as the vehicle 100 is on. Once the vehicle 100 turns off, the symmetric key is deleted, so a different symmetric key will be used for the message topic during the next trip by the vehicle.

The process 400 begins in a block 405 upon the starting of the vehicle 100. In the block 405, the node 106, 108 encrypts a request with its node private key. If the node 106, 108 is a publisher node 106, then the request is a request to publish messages about the message topic. If the node 106, 108 is a subscriber node 108, then the request is a request to subscribe to the message topic. The node 106, 108 then transmits the encrypted request to the manager module 104, which receives the encrypted request as described above with respect to the block 310.

Next, in a block 410, the node 106, 108 receives the encrypted symmetric key transmitted by the manager module 104 as described above with respect to the block 325. The node 106, 108 then decrypts the symmetric key with its node private key.

Next, in a block 415, the node 106, 108 encrypts the sample message with the symmetric key. The sample message is known in advance and stored in the node 106, 108. The sample message is the same sample message stored in the manager module 104. The node 106, 108 then transmits the encrypted sample message to the manager module 104, which receives the encrypted sample message as described above with respect to the block 330.

Next, in a block 420, the node 106, 108 uses the symmetric key to encrypt or decrypt messages about the message topic in the service-oriented architecture. If the node 106, 108 is a publisher node 106, then the symmetric key is the first symmetric key, and the publisher node 106 uses the first symmetric key to encrypt messages about the message topic as reasons to send the messages arise, e.g., data from one of the sensors 116 as the data is produced. If the node 106, 108 is a subscriber node 108, then the symmetric key is the second symmetric key, and the subscriber node 108 uses the second symmetric key to decrypt messages about the message topic as the subscriber node 108 receives the messages. Being able to use the symmetric key for messages about the message topic is more computationally efficient than, e.g., using the node private key.

Next, in a decision block 425, the node 106, 108 determines whether the vehicle 100 has been turned off. If the vehicle 100 is still on, the process 400 returns to the block 420 to continue using the symmetric key to encrypt or decrypt messages about the message topic. If the vehicle 100 has been turned off, the process 400 proceeds to a block 430.

In the block 430, the node 106, 108 deletes the symmetric key. The next time that the vehicle 100 is turned on, the node 106, 108 will receive a new symmetric key for the message topic that is different than the current symmetric key. After the block 430, the process 400 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

The invention claimed is:

1. A computer comprising a processor and a memory storing instructions executable by the processor to:
generate a symmetric key upon starting of a vehicle including a first node of a plurality of nodes on a wired vehicle communications network;
receive a request to publish or subscribe to a first message topic of a plurality of message topics from the first node via the wired vehicle communications network, wherein at least one of the nodes is a publisher of the first message topic that publishes messages about the first message topic over the wired vehicle communications network, at least one of the nodes is a subscriber of the first message topic that receives the messages about the first message topic, and the message topics are categories of data;
authenticate the first node using the request;
authorize the first node by verifying that the node is on a first permission list for the first message topic, the message topics having respective permission lists; and
upon authenticating and authorizing the node, transmit the symmetric key to the node, wherein the symmetric key is usable to encrypt or decrypt messages about the message topic.

2. The computer of claim 1, wherein the instructions include instructions to receive a sample message from the first node encrypted with the symmetric key, decrypt the sample message, and retransmit the symmetric key to the first node upon determining that the decrypted sample message does not match a stored sample message.

3. The computer of claim 1, wherein authenticating the first node includes applying public key cryptography to the request.

4. The computer of claim 3, wherein the public key cryptography is a digital signature for which the request is encrypted with a node private key, and authenticating the first node includes decrypting the request with a node public key paired with the node private key.

5. The computer of claim 4, wherein the instructions include instructions to encrypt the symmetric key with the node public key before transmitting the symmetric key to the first node.

6. The computer of claim 1, wherein the instructions include instructions to generate a plurality of symmetric keys including the symmetric key for the respective message topics including the first message topic.

7. The computer of claim 1, wherein the request is a request to publish the first message topic, and the symmetric key is usable to encrypt messages about the first message topic.

8. The computer of claim 7, wherein the first node is a publisher node, the symmetric key is a first symmetric key, and the instructions include instructions to:
receive a request to subscribe to the first message topic from a subscriber node on the wired vehicle communications network via the wired vehicle communications network;
authenticate the subscriber node using the request to subscribe;
authorize the subscriber node by verifying that the subscriber node is on the first permission list; and
upon authenticating and authorizing the subscriber node, transmit a second symmetric key paired with the first symmetric key to the subscriber node, wherein the second symmetric key is usable to decrypt messages about the first message topic.

9. The computer of claim 1, wherein the symmetric key is not usable to encrypt or decrypt messages about the message topics besides the first message topic.

10. The computer of claim 1, wherein the instructions further include instructions to, in response to the vehicle being turned off, delete the symmetric key.

11. A vehicle system comprising:
a manager module;
a node; and
a wired vehicle communications network connecting the node and the manager module;
wherein the manager module is programmed to:
receive a request to publish or subscribe to a first message topic of a plurality of message topics from a first node of the nodes, wherein at least one of the nodes is a publisher of the first message topic that publishes messages about the first message topic over the wired vehicle communications network, at least one of the nodes is a subscriber of the first message topic that receives the messages about the first message topic, and the message topics are categories of data;
authenticate the first node using the request;
authorize the first node by verifying that the first node is on a first permission list for the first message topic, the message topics having respective permission lists;
upon authenticating and authorizing the first node, transmit a symmetric key to the node;
in response to a vehicle including the manager module and first node being turned off, delete the symmetric key; and
the first node is programmed to encrypt or decrypt messages about the message topic using the symmetric key.

12. The vehicle system of claim 11, further comprising a hardware security module physically connected to the manager module, wherein the first permission list is stored on the hardware security module.

13. The vehicle system of claim 11, wherein the first node is storing a node private key, and the first node is programmed to encrypt the request with the node private key and then transmit the request to the manager module.

14. The vehicle system of claim 13, further comprising a hardware security module physically connected to the manager module, wherein authenticating the first node includes decrypting the request with a node public key paired with the node private key, and the node public key is stored on the hardware security module.

15. The vehicle system of claim 11, wherein the first node is a publisher node, the request is a request to publish the message topic, and the symmetric key is usable to encrypt message about the message topic.

16. The vehicle system of claim 15, further comprising a subscriber node connected to the manager module and the publisher node via the wired vehicle communications network.

17. A method comprising:
generating a symmetric key by a manager module upon starting of a vehicle including a first node of a plurality of nodes on a wired vehicle communications network;

transmitting a request to publish or subscribe to a first message topic of a plurality of message topics by the first node to the manager module in the vehicle, wherein at least one of the nodes is a publisher of the first message topic that publishes messages about the first message topic over the wired vehicle communications network, at least one of the nodes is a subscriber of the first message topic that receives the messages about the first message topic, and the message topics are categories of data;

authenticating the first node using the request by the manager module;

authorizing the first node by verifying that the first node is on a first permission list for the first message topic by the manager module, the message topics having respective permission lists;

upon authenticating and authorizing the first node, transmitting the symmetric key to the node by the manager module; and encrypting or decrypting messages about the message topic using the symmetric key by the first node.

18. The method of claim 17, further comprising, upon receiving the symmetric key, encrypting a sample message with the symmetric key by the first node, and transmitting the encrypted sample message by the node to the manager module.

* * * * *

UNITED STATES PATENT AND TRADEMARK OFFICE
CERTIFICATE OF CORRECTION

Page 1 of 1

PATENT NO. : 12,425,192 B2
APPLICATION NO. : 17/158452
DATED : September 23, 2025
INVENTOR(S) : Francis Obiagwu It is certified that error appears in the above-identified patent and that said Letters Patent is hereby corrected as shown below:

In the Claims

| | |
|---|---|
| Column 9, Line 30, Claim 1: | Insert --first-- before "message"; |
| Column 10, Line 14, Claim 11: | Replace "node" with --plurality of nodes--; |
| Column 10, Line 35, Claim 11: | Insert -- first-- before "node"; and |
| Column 11, Line 18, Claim 17: | Insert --first-- before "node". |

Signed and Sealed this
Twenty-eighth Day of October, 2025

John A. Squires
*Director of the United States Patent and Trademark Office*